United States Patent [19]

Kanai et al.

[11] Patent Number: 4,810,004
[45] Date of Patent: Mar. 7, 1989

[54] REAR SUSPENSION APPARATUS FOR AUTOMOTIVE VEHICLES

[75] Inventors: Seita Kanai, Hiroshima; Takeshi Edahiro, Higashihiroshima; Yoshihiro Sato; Masashi Oda, both of Hiroshima, all of Japan

[73] Assignee: Mazda Motor Corporation, Hiroshima, Japan

[21] Appl. No.: 102,031

[22] Filed: Sep. 29, 1987

[30] Foreign Application Priority Data

Oct. 2, 1986 [JP] Japan ................................. 61-235019

[51] Int. Cl.⁴ ............................ B60G 3/06; B60G 3/20
[52] U.S. Cl. .................................... 280/690; 280/701; 280/716
[58] Field of Search ................ 280/716, 724, 725, 726, 280/675, 661, 676, 690, 700, 671, 675, 690, 701

[56] References Cited

U.S. PATENT DOCUMENTS

| 4,511,160 | 4/1985 | Inoue | 280/690 |
| 4,513,990 | 4/1985 | Morita et al. | 280/725 |
| 4,565,389 | 1/1986 | Kami et al. | 280/688 |
| 4,589,677 | 5/1986 | Matschinsky | 280/675 |
| 4,621,830 | 11/1986 | Kanai | 280/675 |
| 4,722,544 | 2/1988 | Weber | 280/675 |

FOREIGN PATENT DOCUMENTS

| 2818198 | 4/1978 | Fed. Rep. of Germany . |
| 2822058 | 5/1978 | Fed. Rep. of Germany . |
| 58-139810 | 8/1983 | Japan . |
| 60-148707 | 8/1985 | Japan . |
| 60-148708 | 8/1985 | Japan . |
| 61-160308 | 7/1986 | Japan . |
| 61-249808 | 11/1986 | Japan . |

Primary Examiner—Richard A. Bertsch
Attorney, Agent, or Firm—Lynn L. Augspurger

[57] ABSTRACT

A rear suspension apparatus for an automotive vehicle includes a rear wheel support the front and rear ends of which are resiliently supported on the vehicle chassis. The elastic characteristic of the resilient support is such that the front end of the wheel support readily deflects from the outward to the inward side of the vehicle chassis. The resilient support system resiliently supporting the rear end of the wheel support is set in such a manner that the rear end of the wheel support will readily deflect from the inward to the outward side of the vehicle chassis.

21 Claims, 10 Drawing Sheets

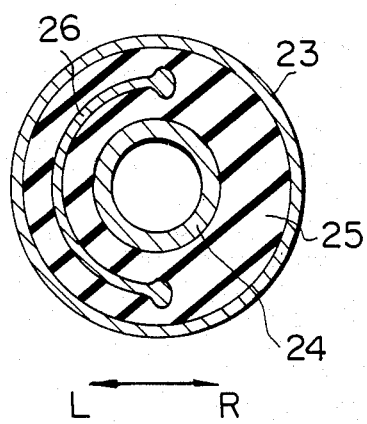
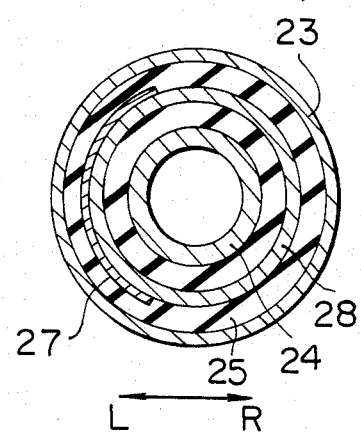
FIG. 3    FIG. 4
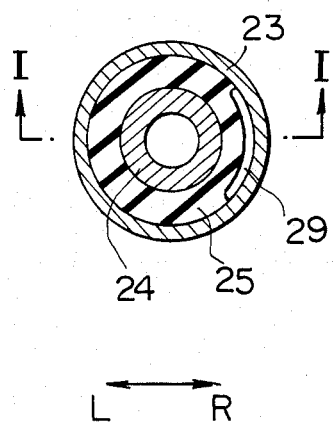
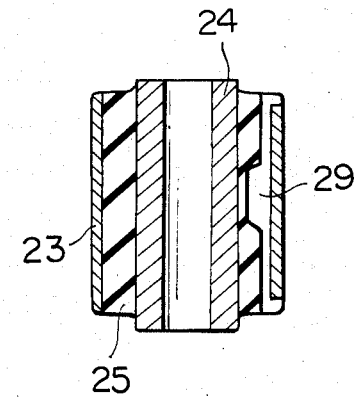
FIG. 5A    FIG. 5B

REAR SUSPENSION APPARATUS FOR AUTOMOTIVE VEHICLES

BACKGROUND OF THE INVENTION

This invention relates to improvements in a rear suspension apparatus provided between the rear wheels and body of an automotive vehicle.

In a previously proposed conventional rear suspension apparatus for an automotive vehicle, the front- and rear-side portions of a wheel support member for supporting a rear wheel are supported on the vehicle chassis via respective resilient members, the elastic characteristics of these resilient members are specially selected, and use is made of the relationship between the lateral forces acting on the rear wheels and the elastic characteristics to perform toe-in control of the rear wheels.

An example of this prior-art arrangement is disclosed in the specification of Japanese Patent Application Laid-Open Publication (KOKAI) No. 60-148707, in which the ratio of the amount of flexibility of the resilient member for the front portion to that of the resilient member for the rear portion is set so as to become large when the action of the lateral force on the rear wheel is small in comparison with when the action of the lateral force is large. Such an expedient improves steerablity when large lateral forces are acting on the rear wheels.

Another example of the prior art is disclosed in the specification of Japanese Patent Application Laid-Open Publication (KOKAI) No. 60-148708, in which the ratio of the amount of flexibility of the resilient member for the front portion to that of the resilient member for the rear portion is set so as to become small when the action of the lateral force on the rear wheel is small in comparison with when the action of the lateral force is large. This prevents sudden reverse steering when a difference between lateral forces is great.

The abovementioned Japanese Patent Application Laid-Open Publication (KOKAI) Nos. 60-148707 and 60-148708 have been filed in the United States as U.S. Pat. No. 4,621,830, claiming the respective Convention priorities.

In the aforementioned prior art, consideration is given only as to how to perform control with regard to the lateral forces acting upon the rear wheels in a direction from the outward side to the inward side of the vehicle.

When making a maneuver such as a lane change at high velocity, the driver turns the steering wheel in one direction and then in the opposite direction in a short period of time. Consequently, as shown in FIG. 13, the design is such that when the front wheels are steered rightward, for example, as indicated at point A, the outer and inner rear wheels will have a tendency to toe in and toe out, respectively, due to the lateral forces acting upon them. (Note that "inner rear wheel" refers to the rear wheel on the inner side of a turn, while "outer rear wheel" refers to the wheel on the outer side of a turn.) Accordingly, in order to improve turnability, the wheel support is resiliently supported in such a manner that the outer rear wheel will be displaced in the toe-in direction upon receiving an inwardly directed lateral force. This fact indicates that the wheel is easily displaced in the toe-out direction with regard to an outwardly lateral force in the opposite direction, namely in a direction from the inward to the outward side of the vehicle. Next, when the vehicle is steered to resume traveling straight ahead, as indicated at point B, the rear inner wheel (which was the rear outer wheel at point A) maintains the toe-in tendency but the rear outer wheel (which was the rear inner wheel at point A) maintains the toe-out tendency due to a delay in response. As a result, in the conventional automotive vehicle, rear gripping force weakens at high velocities and steering readily loses stability.

SUMMARY OF THE INVENTION

Accordingly, an object of the invention is to provide a rear suspension apparatus for an automotive vehicle in which steering stability when making a maneuver such as a lane change at high traveling velocity can be improved by specially designing the elastic characteristic of a wheel support elastically supported with respect to lateral forces.

According to the present invention, the foregoing object is attained by providing an improvement in a rear suspension apparatus which comprises a wheel support member rotatably supporting a rear wheel of an automotive vehicle, the wheel support member having a front-side portion and a rear-side portion spaced away from each other longitudinally of the vehicle chassis, the front-and rear-side portions being resiliently supported on the vehicle chassis, the improvement characterized in that: the wheel support member has an elastic characteristic, with respect to a force acting from an outward to an inward side of the vehicle chassis, in a state different from that of an elastic characteristic with respect to a force acting from the inward side to the outward side of the vehicle chassis; the elastic characteristic of the wheel support member on a side thereof at which the front-side portion is resiliently supported is set so that said side will readily deflect from the outward to the inward side of the vehicle chassis; and the elastic characteristic of the wheel support member on a side thereof at which the rear-side portion is resiliently supported is set so that said side will readily deflect from the inward to the outward side of the vehicle chassis.

In accordance with the invention, the elastic characteristic of the resilient support is set in such a manner that the front end of the wheel support member will be deflected inwardly of the vehicle chassis by a force acting outwardly of the chassis in so far as the resilient support system elastically supporting the front-side portion of the wheel support member is concerned, and such that the rear end of the wheel support member will be deflected outwardly of the vehicle chassis by a force acting inwardly of the chassis in so far as the resilient support system elastically supporting the rear-side portion of the wheel support member is concerned. Therefore, in an automotive vehicle having the suspension of the invention, the arrangement is such that the toe-in tendency of the rear wheels is promoted, or in other words, such that the toe-out tendency of the rear wheels is suppressed, as much as possible with respect to both inwardly and outwardly acting lateral forces. As a result, there is no delay in the response of the toe-in tendency of the rear outer wheel in a maneuver such as a lane change at a high traveling velocity. This enhances the steering stability of the vehicle.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

FIGS. 3, 4 and 5A are longitudinal sectional views each showing a different example of a resilient member;

FIG. 5B is a sectional view taken along line I-I of FIG. 5A;

DESCRIPTION OF THE PREFERRED EMBODIMENTS

Preferred embodiments of the invention will now be described in detail with reference to the accompanying drawings.

Figure 2:
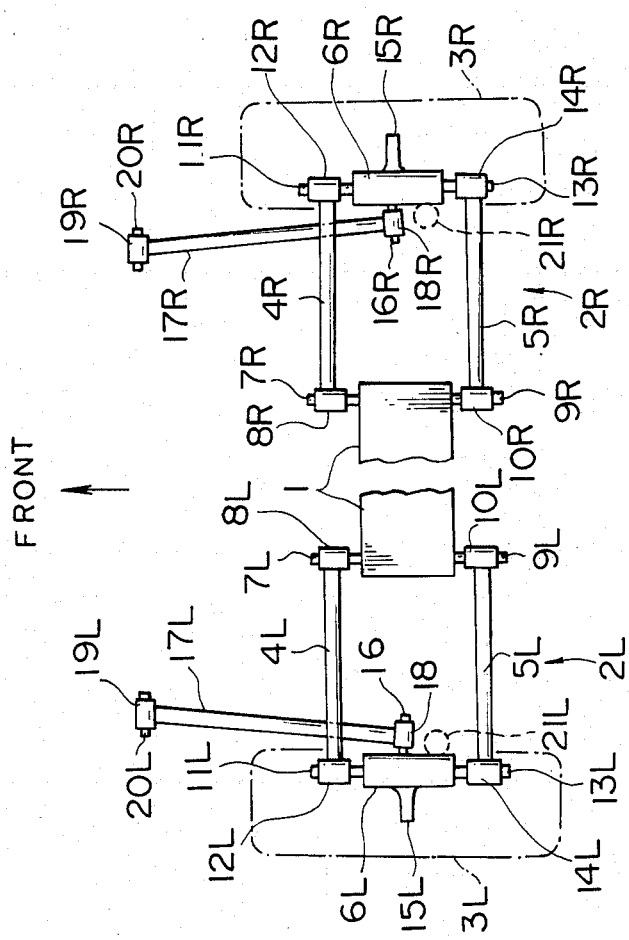
FIG. 2 is a plan view schematically illustrating the construction of a rear suspension apparatus for both the left and right sides of the vehicle.

As shown in FIG. 2, a left rear wheel 3L is supported for free up-and-down motion on a vehicle chassis subframe 1 via a swing arm-type left suspension apparatus 2L. A right rear wheel 3R is supported for free up-and-down motion on the subframe 1 via a swing arm-type right suspension apparatus 2R. The left rear suspension apparatus 2L and right rear suspension apparatus 2R are identically constructed. Therefore, the description that follows will relate solely to the right rear suspension apparatus 2R, and a description of the left rear suspension apparatus 2L will be omitted.

The suspension apparatus 2R is provided with front and rear lateral links 4R and 5R, respectively, extending in the lateral direction of the vehicle. The inner end of the front lateral link 4R is freely pivotally connected via a bush 8R to a support shaft 7R projectively provided on the subframe 1. The inner end of the rear lateral link 5R is freely pivotally connected via a bush 10R to a support shaft 9R projectively provided on the subframe 1.

The outer end of the front lateral link 4R is freely pivotally connected via a bush 12R to a support shaft 11R projectively provided on the front-end portion of a wheel support 6R. The outer end of the rear lateral link 5R is freely pivotally connected via a bush 14R to a support shaft 13R projectively provided on the rear-end portion of the wheel support 6R.

A spindle 15R is projectively provided on the outer end portion of the wheel support 6R, and the rear wheel 3R is freely rotatably supported on the spindle 15R.

The rear-end portion of a tension rod 17R extending generally longitudinally of the chassis is freely pivotally connected via a bush 18R to a support shaft 16R projectively provided on the inner end of the wheel support 6R. The front-end portion of the tension rod 17R is freely pivotally connected via a bush 19R to a support shaft 20R projectively provided on the chassis. The lower end portion of a strut 21R, which is constituted by a hydraulic shock absorber and a coil spring, is connected to the wheel support 6R.

Figure 1:
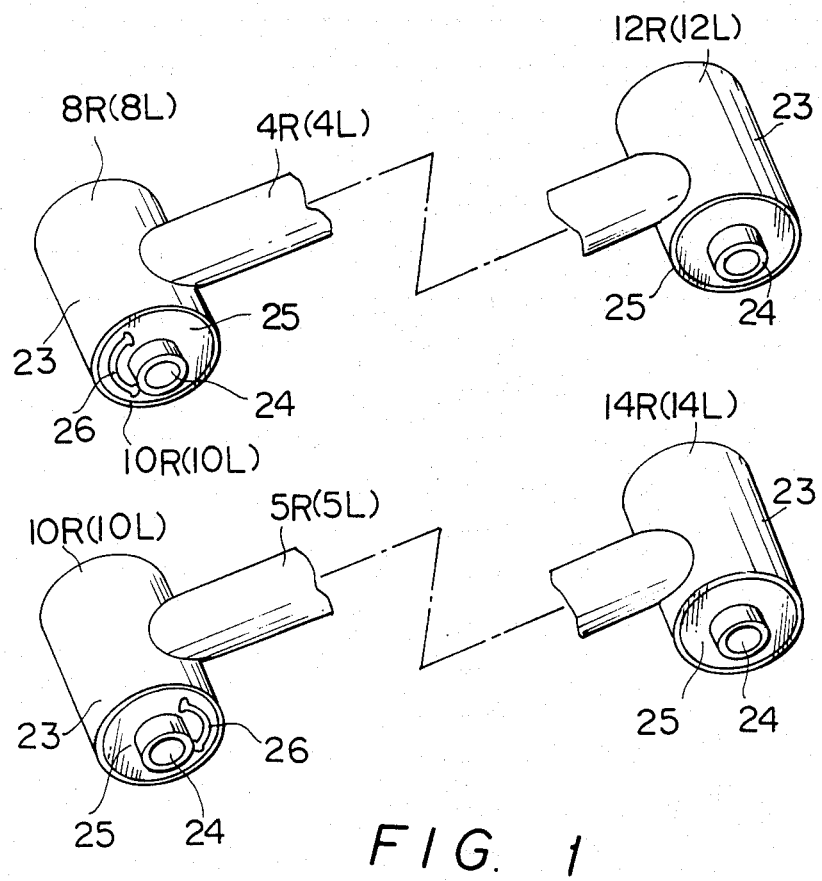
FIG. 1 is a perspective view illustrating the construction of a first embodiment of a rear suspension apparatus for the right side of a vehicle in accordance with the present invention.

As shown in greater detail in FIG. 1, each bush 8R, 10R, 12R and 14R comprises an outer cylinder 23 connected to the corresponding lateral links 4R, 5R, an inner cylinder 24 fitted into the corresponding support shaft 7R, 9R, 11R, 13R, and a resilient member (made of rubber) 25 packed in between the outer cylinder 23 and inner cylinder 24. The elastic characteristics (hardnesses) of the resilient members 25 per se are set so as to be equal.

In order to adjust the elastic characteristic of each resilient member 25, an intermediate half-cylinder 26 made of metal is imbedded in the resilient member 25, as shown in FIG. 3.

By adopting the arrangement having the intermediate half-cylinder 26, the resilient member 25 readily flexes in response to rightward movement R of the inner cylinder 24 but does not readily flex in response to leftward movement L thereof, and readily flexes in response to leftward movement L of the outer cylinder 23 but does not readily flex in response to rightward movement R thereof.

An arrangement different from that of FIG. 3 is shown in FIG. 4, in which an intermediate cylinder 28 made of metal and having an intermediate plate 27 in the shape of a half-cylinder fixed to its outer periphery is imbedded in the resilient member 25. The actions and effects of this arrangement are identical with those of the arrangement shown in FIG. 3.

Further, as shown in the example of FIGS. 5A and 5B, a hollow portion 29 is formed in the resilient member 25. Again, the actions and effects are the same those as those obtained in FIG. 3.

FIG. 1 illustrates a first embodiment employing the resilient member 25 shown in FIG. 3.

Figure 6A:
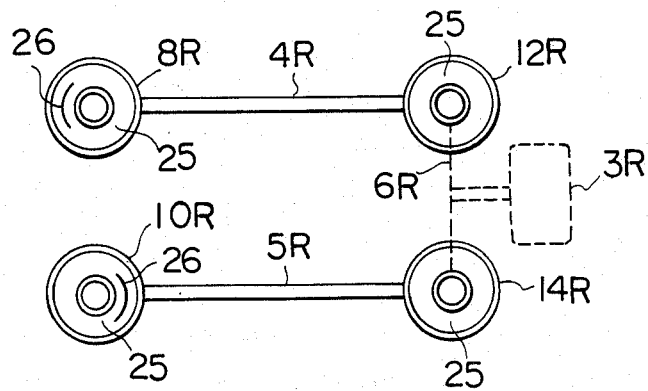
FIGS. 6A through 6C and FIGS. 7A and 7B are side views schematically illustrating first through fifth embodiments, respectively, of a rear suspension for the left side.

In the first embodiment, the intermediate half-cylinder 26 is imbedded in the resilient member 25, on the inward side thereof, of the bush 8R located on the inward side of the front lateral link 4R, as shown schematically in FIG. 6A. Also, the intermediate half-cylinder 26 is imbedded in the resilient member 25, on the outward side thereof, of the bush 10R located on the inward side of the rear lateral link 5R, as shown in FIG. 6A. Accordingly, the characteristics are such that when a lateral force directed inwardly of the vehicle chassis acts upon the rear wheel 3R, the resilient member 25 of bush 8R flexes inwardly with ease, while the resilient member 25 of bush 10R flexes inwardly with difficulty. As a result, the rear wheel 3R has a tendency to toe in. On the other hand, the characteristics are such that when a lateral force directed outwardly of the vehicle chassis acts upon the rear wheel 3R, the resilient member 25 of bush 8R flexes outwardly with difficulty, while the resilient member 25 of bush 10 flexes outwardly with ease. As a result, the rear wheel 3R has a tendency to toe in.

Figure 11:
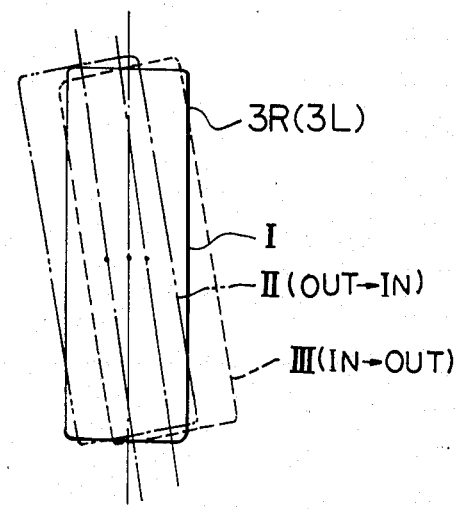
FIG. 11 is a plan view for describing the toe-in tendency of a rear wheel.
Figure 13:
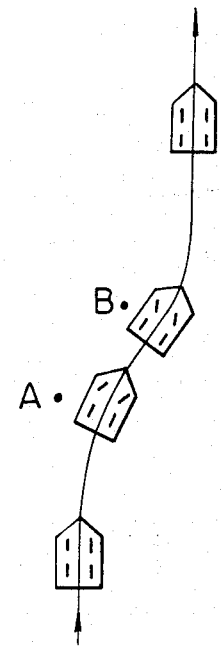
FIG. 13 is a conceptual view depicting the manner in which a lane change is performed at a high traveling velocity.
Figure 12:
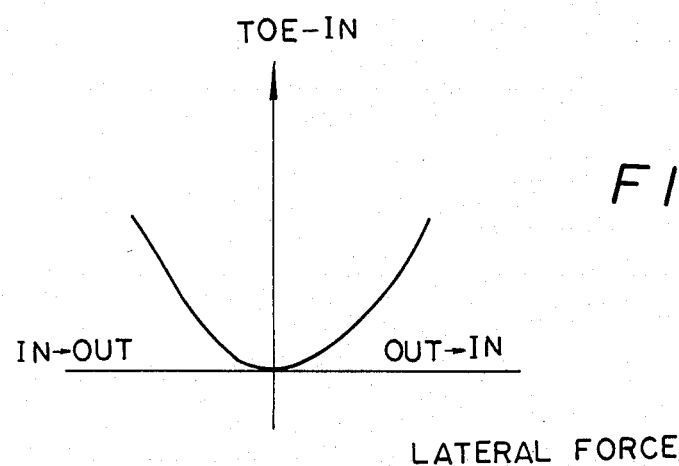
FIG. 12 is a graph illustrating the toe-in tendency of a rear wheel with respect to a lateral force.

Thus, when the front wheels are steered e.g. to the right at point A in a maneuver such as a lane change at a high traveling velocity, as illustrated in FIG. 13, the inner rear wheel 3R and outer rear wheel 3L both tend to toe in, as shown by the sequence I→II→III in FIG. 11. Then, when the front wheels are re-steered to straighten out the vehicle at point B, the outer rear wheel 3R tends to toe in from the first, as indicated by the sequence II→III in FIG. 11. Since the delay in response encountered in the prior art thus does not occur, steering stability is enhanced (see FIG. 12).

Figure 6B:
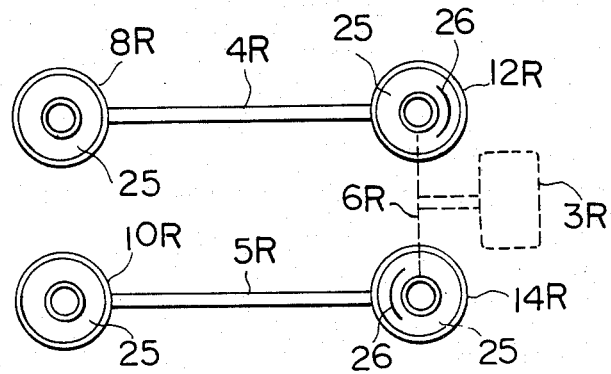

The arrangement shown in FIG. 6B indicates a second embodiment of the invention. As shown in FIG. 6B, the intermediate half-cylinder 26 is imbedded in the resilient member 25, on the outward side thereof, of the bush 12R located on the outward side of the front lateral link 4R. Also, the intermediate half-cylinder 26 is imbedded in the resilient member 25, on the inward side thereof, of the bush 14R located on the outward side of the rear lateral link 5R. Accordingly, the characteristics are such that the resilient member 25 of bush 12R flexes inwardly with ease, while the resilient member 25 of bush 14R flexes outwardly with ease. As a result, the rear wheel 3R has a tendency to toe in.

Figure 6C:
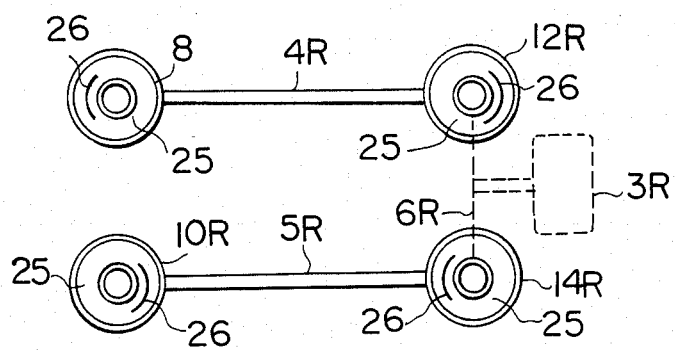

The arrangement shown in FIG. 6C indicates a third embodiment of the invention. As shown in FIG. 6C, the intermediate half-cylinder 26 is imbedded in the resilient member 25, on the inward side thereof, of the bush 8R located on the inward side of the front lateral link 4R. The intermediate half-cylinder 26 is also imbedded in the resilient member 25, on the outward side thereof, of the bush 12R located on the outward side of the front lateral link 4R. Further, the intermediate half-cylinder 26 is imbedded in the resilient member 25, on the outward side thereof, of the bush 10R located on the inward side of the rear lateral link 5R. The intermediate half-cylinder 26 is also imbedded in the resilient member 25, on the inward side thereof, of the bush 14R located on the outward side of the rear lateral link 5R. Accordingly, the characteristics are such that the resilient members 25 of bushes 8R, 12R flex inwardly with ease, while the resilient members 25 of bushes 10R, 14R flex outwardly with ease. As a result, the rear wheel 3R has a tendency to toe in.

Figure 7A:
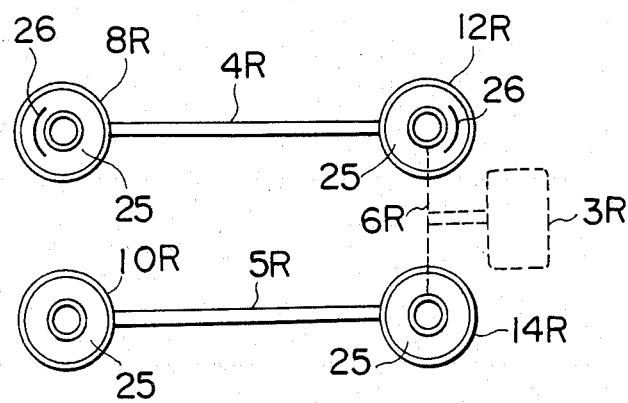

The arrangement shown in FIG. 7A indicates a fourth embodiment of the invention. As shown in FIG. 7A, the intermediate half-cylinder 26 is imbedded in the resilient member 25, on the inward side thereof, of the bush 8R located on the inward side of the front lateral link 4R. The intermediate half-cylinder 26 is also imbedded in the resilient member 25, on the outward side thereof, of the bush 12R located on the outward side of the front lateral link 4R. Accordingly, the elastic characteristics of the resilient members 25 of the rear lateral link 5R are identical for both inwardly and outwardly directed lateral forces, while the characteristics are such that the resilient members 25 of bushes 8R, 12R of the front lateral link 4R flex inwardly with ease. As a result, when an outwardly directed lateral force acts upon the vehicle chassis, the toe-out tendency of the rear wheel 3R is suppressed as much as possible In other words, the rear wheel 3R tends to toe in.

Figure 7B:
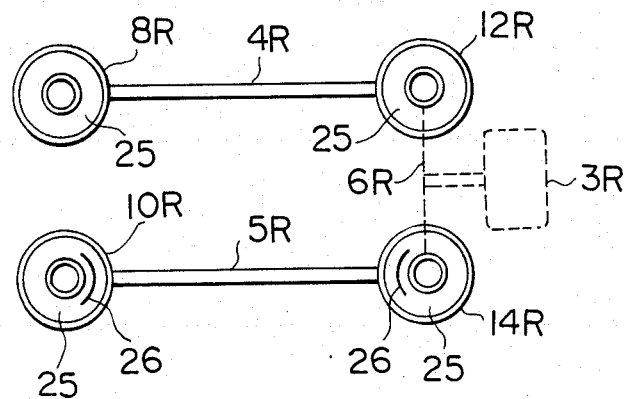

The arrangement shown in FIG. 7B indicates a fifth embodiment of the invention. As shown in FIG. 7B, the intermediate half-cylinder 26 is imbedded in the resilient member 25, on the outward side thereof, of the bush 10R located on the inward side of the rear lateral link 5R. The intermediate half-cylinder 26 is also imbedded in the resilient member 25, on the inward side thereof, of the bush 14R located on the outward side of the rear lateral link 5R. Accordingly, the elastic characteristics of the resilient members 25 of the front lateral link 4R are identical for both inwardly and outwardly directed lateral forces, while the characteristics are such that the resilient members 25 of bushes 10R, 14R of the rear lateral link 5R flex inwardly with difficulty. As a result, when an outwardly directed lateral force acts upon the vehicle chassis, the toe-in tendency of the rear wheel 3R is promoted with respect to an inwardly directed lateral force while the toe-out tendency thereof is suppressed as much as possible.

In the fifth embodiment, it is conceivable that toe in may not always be achieved in response to an outwardly directed lateral force, depending upon the hardnesses of the resilient members 25, 25 of the front and rear lateral links, respectively. However, in comparison with the prior-art arrangement in which the elastic characteristics of the resilient members are not made asymmetrical, the abovementioned problem can be eliminated to a great extent overall.

Figure 8:
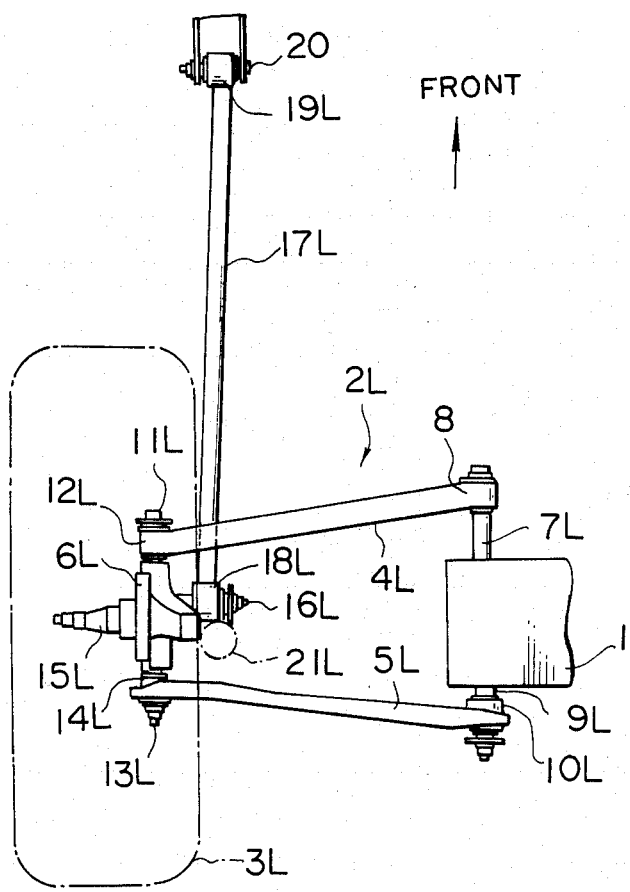
FIG. 8 is a plan view illustrating another embodiment of a rear suspension apparatus according to the invention.
Figure 9:
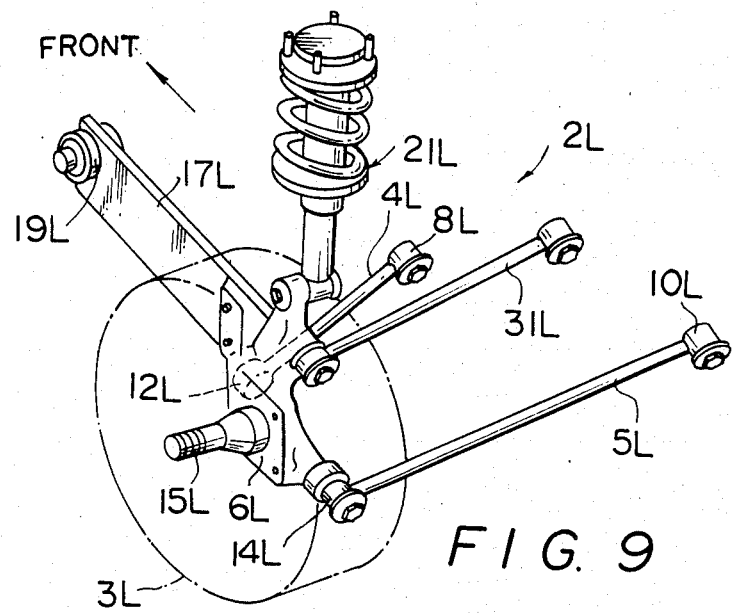
FIGS. 9 and 10 are perspective views showing the rear suspension apparatus of FIG. 8 as seen from different directions.
Figure 10:
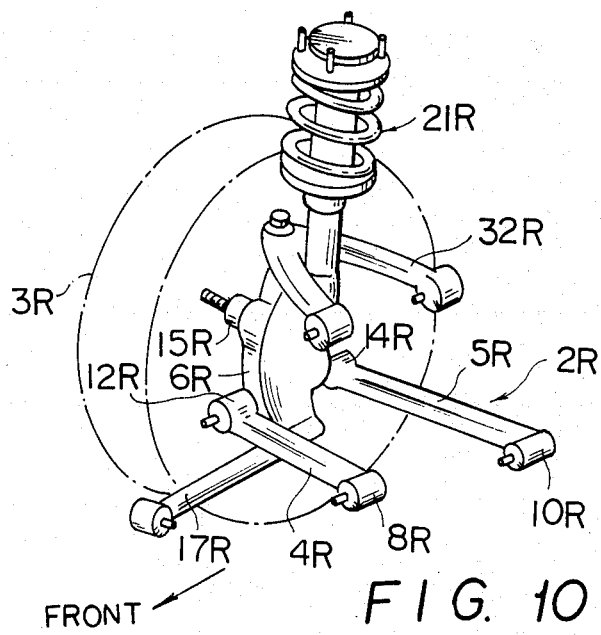

FIGS. 8 through 10 illustrate another embodiment in which the present invention is applied to a suspension apparatus having a configuration different from that of FIG. 3. The elements of this embodiment that are identical with those of FIG. 2 are designated by like reference characters.

FIG. 8 illustrates the arrangement on the side of the left rear wheel 3L. In this embodiment, a so-called trapezoidal link configuration is employed, in which the spacing between the front and rear lateral links 4L, 5L is greater on the inward side of the vehicle chassis than on the outward side.

As shown in the perspective view of FIG. 9, the arrangement depicted in FIG. 2 is additionally provided with a single rod-shaped upper arm 31L extending linearly in the lateral direction of the vehicle. The wheel support 6L and the chassis (subframe 1) are coupled to each other by the upper arm 31L. Also, the tension rod 17 is formed to have a plate-shaped configuration.

FIG. 10 shows an example in which an A-shaped upper arm 32R is used in place of the linear upper arm 31L in the arrangement of FIG. 9. It should be noted that FIG. 10 relates to the right rear wheel 3R.

As many apparently widely different embodiments of the present invention can be made without departing from the spirit and scope thereof, it is to be understood that the invention is not limited to the specific embodiments thereof except as defined in the appended claims.

More specifically, in the various embodiments set forth above, it is described that the elastic characteristics of the bushes mounting the lateral links on the vehicle chassis or wheel supports are specially contrived. However, the present invention is not limited to these arrangements. For example, it is permissible to adopt an arrangement in which the lateral links are divided into two segments, a resilient member is disposed at the point where each division is made and these members are endowed with different elastic characteristics.

Figure 14:
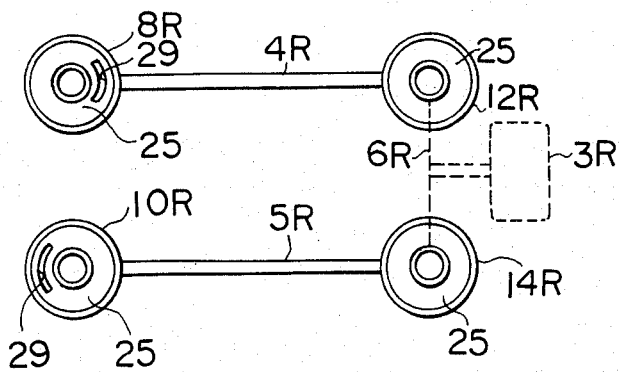
FIGS. 14A through 14C and FIGS. 15A and 15B are side views schematically illustrating first through fifth embodiments each using a cavity, respectively, of a rear suspension for the left side.
Figure 14:
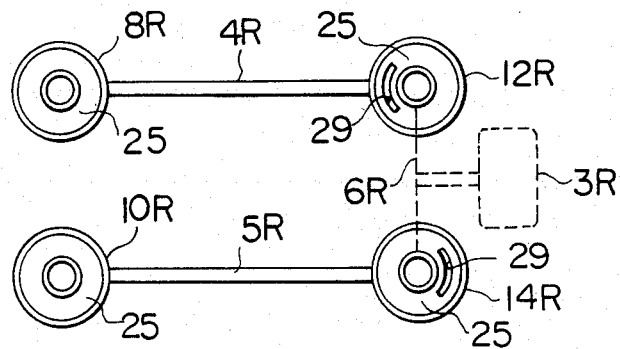
Figure 14:
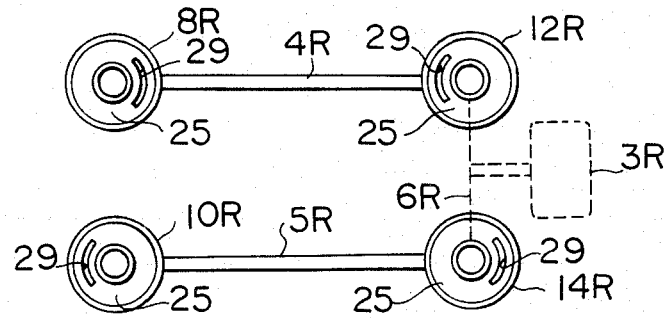
Figure 15A:
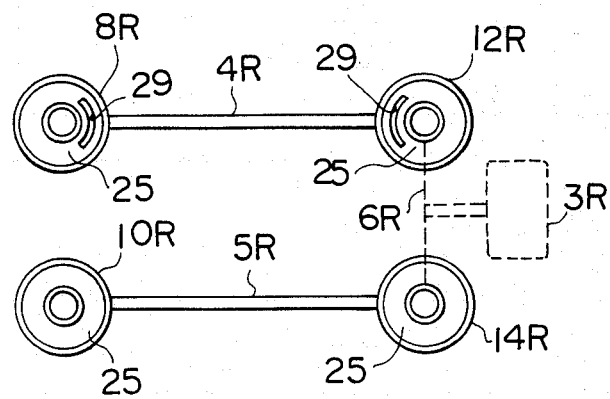
Figure 15B:
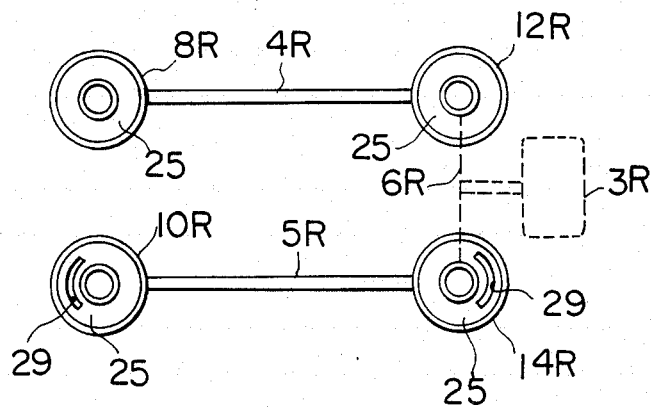

Further, the hollow portion 29 shown in FIG. 5A can be used in the manner shown in FIGS. 14A through 14C and in FIGS. 15A and 15B.

Still further, the lateral link is divided into two link portions which are pivotally jointed with each other through the rubber bush.

What is claimed is:

1. In a rear suspension apparatus which comprises a wheel support member rotatably supporting a rear wheel of an automotive vehicle, said wheel support member having a front-side portion and a rear-side portion spaced away from each other longitudinally of a vehicle chassis, said front-and rear-side portions being resiliently supported on the vehicle chassis, the improvement in which:

said wheel support member is provided with elastic means having an elastic characteristic, with respect to a force acting from an outward to an inward side of the vehicle chassis, in a state different from that of an elastic characteristic with respect to a force acting from the inward side to the outward side of the vehicle chassis;

the elastic characteristic of said elastic means on a side thereof at which the front-side portion is resiliently supported is set so that said side will readily deflect from the outward to the inward side of the vehicle chassis; and the elastic characteristic of said elastic means on a side thereof at which the rear-side portion is resiliently supported is set so that said side will readily deflect from the inward to the outward side of the vehicle chassis.

2. The rear suspension apparatus according to claim 1, wherein said elastic means is so adapted that the rear wheel has a tendency to toe in in response to both a force acting from the outward to the inward side of the vehicle chassis and a force acting from the inward to the outward side of the vehicle chassis in a state where the vehicle chassis is turning.

3. The rear suspension apparatus according to claim 1, wherein said wheel support member is supported for free vertical movement on the vehicle chassis by two lateral links provided in side-by-side relation on front and rear ends of said wheel support member.

4. The rear suspension apparatus according to claim 3, wherein said two lateral links are arranged in non-parallel relation and form a trapezoidal suspension mechanism.

5. The rear suspension apparatus according to claim 3, which further comprises an upper link disposed at an upper part of said wheel support member and forming a wishbone-type suspension mechanism.

6. The rear suspension apparatus according to claim 3, wherein said elastic means include a rubber bush which is provided on one of the vehicle chassis and wheel support member, and through which at least one end of each of said lateral links is pivotally mounted.

7. The rear suspension apparatus according to claim 6, wherein said rubber bush comprises an inner cylinder member, an outer cylinder member internally accommodating said inner cylinder member, and a resilient body disposed between said inner cylinder member and said outer cylinder member.

8. The rear suspension apparatus according to claim 7, wherein said rubber bush has an intermediate cylinder imbedded in said resilient body.

9. The rear suspension apparatus according to claim 8, wherein said intermediate cylinder is disposed inside the rubber bush situated on the side of the wheel support member.

10. The rear suspension apparatus according to claim 8, wherein said intermediate cylinder is disposed inside the rubber bush situated on the side of the vehicle chassis.

11. The rear suspension apparatus according to claim 8, wherein said intermediate cylinder is disposed inside the rubber bush situated on the side of the wheel support member and inside the rubber bush situated on the side of the vehicle chassis.

12. The rear suspension apparatus according to claim 7, wherein said resilient body has a hollow portion in the interior thereof.

13. The rear suspension apparatus according to claim 12, wherein said hollow portion is formed in the rubber bush situated on the side of the vehicle chassis.

14. The rear suspension apparatus according to claim 12, wherein said hollow portion is formed in the rubber bush situated on the side of the wheel support member.

15. The rear suspension apparatus according to claim 12, wherein said hollow portion is formed in the rubber bush situated on the side of the wheel support member and in the rubber bush situated on the side of the vehicle chassis.

16. In a rear suspension apparatus which comprises a wheel support member rotatably supporting a rear wheel of an automotive vehicle, said wheel support member having a front-side portion and a rear-side portion spaced away from each other longitudinally of a vehicle chassis, said front-and rear-side portions being resiliently supported on the vehicle chassis, the improvement in which:

said wheel support member is provided with elastic means having an elastic characteristic, with respect to a force acting from an outward to an inward side of the vehicle chassis, in a state different from that of an elastic characteristic with respect to a force acting from the inward side to the outward side of the vehicle chassis, and the elastic characteristic of said elastic means on a side thereof at which the front-side portion is resiliently supported is set so that said side will readily deflect from the outward to the inward side of the vehicle chassis.

17. In a rear suspension apparatus which comprises a wheel support member rotatably supporting a rear wheel of an automotive vehicle, said wheel support member having a front-side portion and a rear-side portion spaced away from each other longitudinally of a vehicle chassis, said front-and rear-side portions being resiliently supported on the vehicle chassis, the improvement in which:

said wheel support member is provided with elastic means having an elastic characteristic, with respect to a force acting from an outward to an inward side of the vehicle chassis, in a state different from that of an elastic characteristic with respect to a force acting from the inward side to the outward side of the vehicle chassis, and the elastic characteristic of said elastic means on a side thereof at which the rear-side portion is resiliently supported is set so that said side will readily deflect from the inward to the outward side of the vehicle chassis.

18. In a rear suspension apparatus which comprises a wheel support member rotatably supporting a rear wheel of an automotive vehicle, said wheel support member having a front-side portion and a rear-side portion spaced away from each other longitudinally of a vehicle chassis, said front-and rear-side portions being resiliently supported on the vehicle chassis, the improvement in which:

said wheel support member is provided with elastic means having an elastic characteristic, with respect to a force acting from an outward to an inward side of the vehicle chassis, in a state different from that of an elastic characteristic with respect to a force acting from the inward side to the outward side of the vehicle chassis;

the elastic characteristic of said elastic means on a side thereof at which the front-side portion is resiliently supported is set so that said side will readily deflect from the outward to the inward side of the vehicle chassis;

the elastic characteristic of said elastic means on a side thereof at which the rear-side portion is resiliently supported is set so that said side will readily deflect from the inward to the outward side of the vehicle chassis;

said elastic means is so adapted that the rear wheel has a tendency to toe in in response to both a force acting from the outward to the inward side of the vehicle chassis and a force acting from the inward to the outward side of the vehicle chassis in a state where the vehicle chassis is turning;

said wheel support member is supported for free vertical movement on the vehicle chassis by two lateral links provided in side-by-side relation on front and rear ends of said wheel support member; and said elastic means include a rubber bush which is provided on one of the vehicle chassis and wheel support member, and through which at least one end of each of said lateral links is pivotally mounted, said rubber bush comprising an inner cylinder member, an outer cylinder member internally accommodating said inner cylinder member, and a resilient body disposed between said inner cylinder member and said outer cylinder member.

19. In a rear suspension apparatus which comprises a wheel support member rotatably supporting a rear wheel of an automotive vehicle, said wheel support member having a front-side portion and a rear-side portion spaced away from each other longitudinally of a vehicle chassis, said front-and rear-side portions being resiliently supported on the vehicle chassis, the improvement which comprises:

first resilient support means for resiliently supporting the front-side portion of said wheel support member and having an elastic characteristic, with respect to a force acting from an outward side to an inward side of the vehicle chassis, set in such a manner that a spring constant decreases from the outward side to the inward side of the vehicle chassis; and second resilient support means for resiliently supporting the rear-side portion of said wheel support member and having an elastic characteristic, with respect to a force acting from an outward side to an inward side of the vehicle chassis, set in such a manner that a spring constant thereof decreases from the inward side to the outward side of the vehicle chassis.

20. In a rear suspension apparatus which comprises a wheel support member rotatably supporting a rear wheel of an automotive vehicle, said wheel support member having a front-side portion and a rear-side portion spaced away from each other longitudinally of a vehicle chassis, said front-and rear-side portions being resiliently supported on the vehicle chassis, the improvement which comprises:

resilient support means for resiliently supporting the front-side portion of said wheel support member and having an elastic characteristic, with respect to a force acting from an inward side to an outward side of the vehicle chassis, set in such a manner that a spring constant decreases from the outward side to the inward side of the vehicle chassis.

21. In a rear suspension apparatus which comprises a wheel support member rotatably supporting a rear wheel of an automotive vehicle, said wheel support member having a front-side portion and a rear-side portion spaced away from each other longitudinally of a vehicle chassis, said front-and rear-side portions being resiliently supported on the vehicle chassis, the improvement which comprises:

resilient support means for resiliently supporting the rear-side portion of said wheel support member and having an elastic characteristic, with respect to a force acting from an outward side to an inward side of the vehicle chassis, set in such a manner that a spring constant thereof decreases from the inward side to the outward side of the vehicle chassis.

* * * * *